United States Patent [19]

Spector

[11] Patent Number: 4,874,561

[45] Date of Patent: Oct. 17, 1989

[54] METHOD FOR DESIGNING PARAMETRIC MOLDING APPARATUS

[75] Inventor: David P. Spector, Sausalito, Calif.

[73] Assignee: Sola USA, Inc., Petaluma, Calif.

[21] Appl. No.: 163,771

[22] Filed: Mar. 3, 1988

[51] Int. Cl.$^4$ .............................................. B29D 11/00
[52] U.S. Cl. ..................................... 264/1.1; 249/160; 264/2.2; 425/808
[58] Field of Search ................... 264/1.1, 2.2; 425/808; 249/82, 160

[56] References Cited

U.S. PATENT DOCUMENTS

| | | | |
|---|---|---|---|
| 2,745,138 | 5/1956 | Beattie | 249/82 |
| 2,890,486 | 6/1959 | Cramdon | 249/82 |
| 3,881,683 | 5/1975 | Whitney | 425/808 |

*Primary Examiner*—James Lowe

*Attorney, Agent, or Firm*—Harris Zimmerman; Howard Cohen

[57] ABSTRACT

A method for designing a molding apparatus, especially for molding lenses and the like, comprises defining a nominal mold reference curve disposed between a pair of mold members having smooth, curved surfaces in confronting relationship to define a mold cavity therebetween. A plurality of concave and convex molding members are provided, all having differing molding surface curvatures but identical spacing from the respective curved surface to the nominal reference curve, measured from the point of closest approach of the curved surface to the reference curve. Any paired concave and convex molding surfaces have the same spacing from the reference curve and thus from each other, so that, for example, a universal gasket can be employed to hold any two paired convex and concave molding members in precise spacing, without regard to the curvature of the molding surfaces.

4 Claims, 1 Drawing Sheet

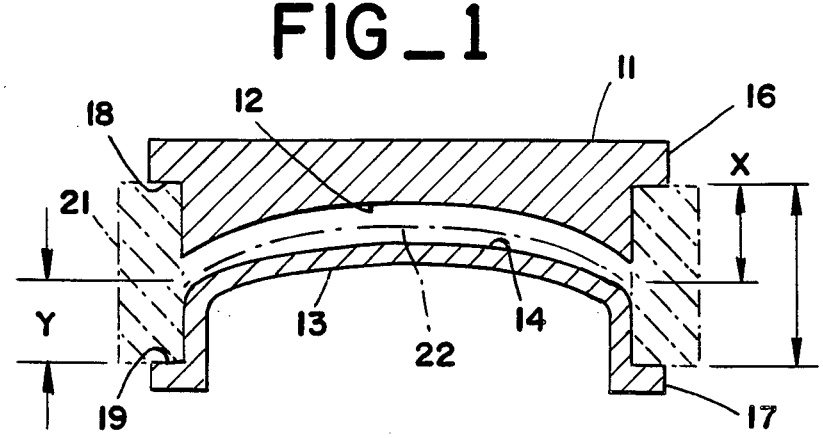
FIG_1
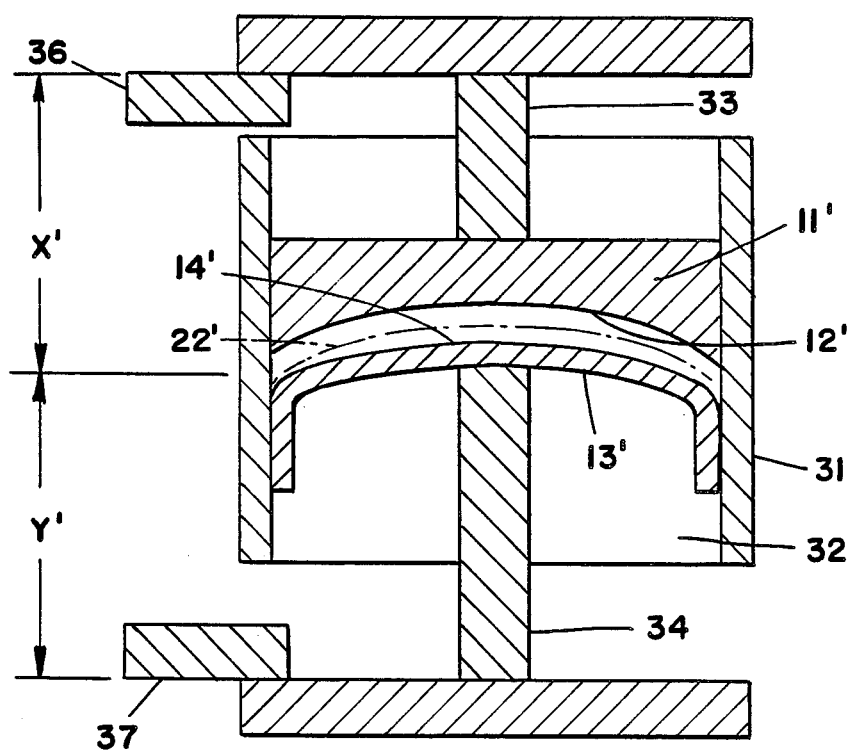
FIG_2

METHOD FOR DESIGNING PARAMETRIC MOLDING APPARATUS

BACKGROUND OF THE INVENTION

In the field of manufacturing ophthalmic lenses, it is generally recognized in the prior art that the most economical means of forming such lenses is by molding a lens forming material between dies or molding members having smooth optical molding surfaces with the appropriate curvature to impart the desired optical properties. Generally the lens forming material is a polymer compound, such as an acrylic, methacrylate, polycarbonate, or the like.

It is evident that a critical factor in the molding of lenses is the molding members themselves. Generally, a large plurality of front surface and rear surface molds must be provided, each having a unique optical surface-forming characteristic. To fill a particular ophthalmic prescription, appropriate front surface and rear surface molding members are chosen, an optimal lens thickness is calculated for the two selected molds, and a gasket or the like is either selected or fabricated to secure the molds together to define the molding cavity. The cavity is then filled with lens compound, cured or polymerized by heat, radiation, or chemical action, and the finished lens is removed from the assembly.

The process outlined above requires a very large number of front and rear surface molds, in order to fill the hundreds of thousands of ophthalmic prescriptions commonly required. Furthermore, a large number of gaskets are required for this process, due to the fact that the gaskets must form a seal with the variously curved edge configurations of the mold members, and that the thickness of the lenses must be determined by the spacing of mold members created by the gaskets. In this regard, the mold spacing is generally measured between the confronting optical forming surfaces of the mold members. It is vital that the mold spacing be greater than a predetermined minimum, both to produce a lens of sufficient thickness and strength, and to prevent mold crashing and mutual destruction.

The large number of mold members and gaskets that must be inventoried to carry out the process described above represents a considerable capital investment which is difficult to recoup through commercial sales. Therefore it has been necessary in the prior art to simplify the process by reducing the number of components inventoried. The most straightforward simplification is to mold lenses having the desired front surface and a stock rear surface (or vice-versa) that can be ground to the desired finished lens by a dispensing optical laboratory or the like. This tactic introduces a post-manufacturing labor expense, and requires trained personnel for high quality lenses. Furthermore, it is not an improvement in the prior art molding technology, but rather an expedient shortcut to make the technology commercially viable. There is an obvious need in the prior art for a molding methodology that reduces the number of molding components while providing the capability of filling the large number of common ophthalmic prescriptions.

SUMMARY OF THE PRESENT INVENTION

The present invention generally comprises a method for designing molding components, and particularly lens molding components. A salient feature of the invention is that it reduces the number of molding dies, compared to prior art molding technology, required to produce the same variety of ophthalmic lenses. Furthermore, in molding processes requiring gaskets or the like to secure two molding members together to form a molding cavity, the number and variety of gaskets required is reduced to a very great extent.

The method for designing a molding apparatus, especially for molding lenses and the like, comprises defining a nominal mold reference curve disposed between a pair of mold members having smooth, curved surfaces in confronting relationship to define a mold cavity therebetween. It is possible to define a single value of reference curvature such that all lenses within a typical design family are bisected by this imaginary surface without interference; that is so that for all plus lenses, $$\text{front curve} \geq \text{reference curve} \geq \text{back curve},$$

and for all minus lenses, $$\text{back curve} \geq \text{reference curve} \geq \text{front curve}.$$

This phenomenon is a result of the optical and physical uniformity of human eye and facial features, and has been discussed in the prior art.

A plurality of concave and convex molding members are provided, all having differing molding surface curvatures but identical spacing from the respective curved surface to the nominal reference curve, measured from the point of closest approach of the curved surface to the reference curve. (That is, between the center of a negative lens and the reference curve, or between the edge of a positive lens and the reference curve.)

Any paired concave and convex molding surfaces have the same spacing from the reference curve and thus from each other, so that, for example, a universal gasket can be employed to hold any two paired convex and concave molding members in precise spacing, without regard to the curvature of the molding surfaces. Thus any lens formed by the method of the present invention comprises two indivisable portions: a front portion extending from the reference curve to the front surface, and a rear portion extending from the reference surface to the rear surface.

BRIEF DESCRIPTION OF THE DRAWING

FIG. 1 is a cross-sectional elevation of a lens molding assembly arranged according to the present invention and employing a gasket sleeve to join the molding members in a casting assembly.

FIG. 2 is a cross-sectional elevation of a lens molding assembly arranged according to the present invention and employing compression molding components to form a lens.

DESCRIPTION OF THE PREFERRED EMBODIMENT

The present invention generally comprises a method for designing molding components, and particularly lens molding components. The method is directed toward a lens molding system that is capable of filling a large portion of the most common ophthalmic prescriptions, using a plurality of molding dies far less numerous than any prior art lens molding technique.

With regard to FIG. 1, the present invention provides a plurality of front surface molding dies, represented by the molding die 11 having a concave optical molding surface 12, and a plurality of rear surface molding dies, represented by the molding die 13 having a convex optical molding surface 14. The molding surfaces 12 and 14 may be formed by grinding and polishing a glass or metal material, or by electrodeposition on previously formed optical surfaces, both techniques being well known in the prior art. In the embodiment of FIG. 1, both dies are generally cylindrical, with the axes of the cylinders generally passing through the central portions of the respective molding surfaces. The die 11 is provided with a flange 16 extending radially outwardly from the die and spaced axially from the surface 12, and the die 13 is provided with a flange 17, also extending radially outwardly from the die and spaced axially from the surface 14. The flanges 16 and 17 are provided with annular surfaces 18 and 19, respectively, that are disposed in confronting, spaced apart relationship.

The invention also includes a gasket or sleeve 21 adapted to join together the two dies in a casting assembly. The sleeve is generally cylindrical in configuration, with a diameter sufficient to form a sealing engagement about the peripheral surfaces of both dies, with the ends of the sleeve 21 in abutting relationship with the flanges 16 and 17. The length of the sleeve between the two flanges 16 and 17 is generally constant and the same for any combination of dies 11 and 13.

An important feature of the present invention is the establishment of a reference curve 22 disposed between the molding surfaces 12 and 14. The reference curve represents the nominal plano curve of the lenses produced by this method; i.e., a plano lens has both front and rear surfaces extending parallel to the reference curve. The reference curve 22 is also used to establish the proper spacing of the dies and of the molding surfaces 12 and 14. Throughout the plurality of dies 11 and 13, the spacing of the surface 12 and the reference curve 22 is fixed and identical, and the spacing of the surface 14 and the reference curve 22 is likewise fixed and identical. The spacing between the surfaces 12 or 14 and the reference curve is measured from the point of closest approach of the molding surface to the reference curve. This factor determines that either the center of a negative lens, or the edge of a positive lens molded according to the present invention will have a fixed thickness, throughout the range of ophthalmic prescriptions.

It is significant to note that the flange 16 is disposed at a predetermined axial distance from the surface 12, and the flange 17 is likewise disposed at a predetermined axial distance from the surface 14. Thus the distance X between the flange surface 18 and the reference curve, and the distance Y from the flange surface 19 and the reference curve is fixed in the casting assembly by the sleeve, regardless of the dies selected to form a particular lens.

To employ the invention as described in FIG. 1, dies 11 and 13 are selected in accordance with the ophthalmic prescription to be filled, and a sleeve 21 is selected with a length that assures that the optical forming surfaces 12 and 14 are spaced apart from the reference curve by the predetermined, fixed distance. Lens casting compound is then introduced into the cavity defined between the molding surfaces and the sleeve interior surface, by injection or the like, and the compound is cured or polymerized to form the finished lens. The sleeve is then removed, and the lens is stripped from the dies. The dies may then be cleaned and stored for reuse.

A further embodiment of the present invention, depicted in FIG. 2, is adapted to form lenses by compression molding, using the principles elucidated in the embodiment of FIG. 1. A pair of molding dies 11' and 13' are provided with optical forming surfaces 12' and 14', as described previously. In this embodiment, the dies are provided with smooth peripheral walls, and are dimensioned to be slidably received within the bore b 32 of a cylindrical sleeve 31. As before, the molding surfaces 12' and 14' are positioned at a fixed, constant distance from a reference curve 21'. The die 11' is secured to a piston 33 aligned coaxially with the sleeve 31, and the die 13' is secured to a coaxial piston 34. A pair of piston stops 36 and 37 are also provided to limit the travel of the respective pistons 33 and 34 toward the reference curve 2 to distances X' and Y'. The distances X' and Y' are calculated so that the molding surfaces 12' and 14' can be moved by their respective pistons toward the reference curve only as close as the spacing limit from the reference curve.

In the embodiment of FIG. 2, a pair of dies 11' and 13' are selected in accordance with the ophthalmic prescription to be filled, and the dies are assembled to their respective pistons. A charge of lens-forming material is introduced into the bore 32 between the dies, and the dies are moved together by the pistons to compress the lens forming material and mold it into the shape determined by the surfaces 12' and 14'. The material is then solidified by curing, polymerization, cooling, or the like, depending on the composition and properties of the material. The pistons are then retracted, and the finished lens is stripped from the dies. The dies may then be removed, cleaned, and stored for future use.

In the method depicted in FIG. 2, the lens forming material may be injected into the cavity within the cylinder, with the dies inserted to the limit determined by the stops 36 and 37, as in prior art injection molding techniques. Likewise, a hybrid lens forming technique employing injection of the material followed by compression of the dies may also be practiced within the scope of the invention.

The method described with regard to FIGS. 1 and 2, termed the parametric mold design, not only produces lenses of uniform thickness, it also minimizes the number of dies required to produce a full range of multifocal lenses, either stock lenses (without cylinder power) or finished lenses with cylinder power. For example, the following table illustrates a comparison of the parametric design method with a typical prior art lens molding system for producing 75 mm CR39 stock lenses in a range of base powers from $-4.00D$ to $+4.00D$. Add powers are in 0.25 diopter increments to $+3.00D$, and cylinder powers are in 0.25 diopter increments to $-2.00D$.

| | NUMBER OF PARTS REQUIRED | | |
|---|---|---|---|
| | Single Vision | Multifocal without cylinder | Multifocal with cylinder |
| Parametric fronts | 5 | 65 | 65 |
| Parametric backs | 153 | 17 | 153 |
| TOTAL | 158 | 82 | 218 |
| CR39 fronts | 33 | 429 | 429 |
| CR39 backs | 63 | 7 | 63 |
| TOTAL | 96 | 436 | 492 |

The parametric mold design method thus required 458 mold dies to produce the full range of lenses, while the prior art method requires 1024 dies. Thus it is apparent that the present invention obtains substantial savings, not only in the high capital costs associated with procuring molding dies, but also in maintaining a large inventory of dies. Furthermore, the present invention prevents clashing of the dies in the molding process, an event that occurs occassionally in prior art molding systems and results in destruction of the dies.

I claim:

1. A method for producing ophthalmic lenses, comprising the steps of providing a first plurality of front surface molding dies having concave optical forming surfaces, providing a second plurality of rear surface molding dies having convex optical forming surfaces, providing a lens forming assembly adapted to retain an arbitrarily selected pair of dies comprising any one of said first plurality of front surface molding dies and any one of said second plurality of rear surface molding dies in confronting relationship, defining an imaginary molding reference curve disposed between said pair of dies, providing first spacing means for each of said first plurality of dies to interact with said lens forming assembly and space the respective concave optical forming surface of each of said first plurality of dies a first fixed distance from said reference curve, providing second spacing means for each of said second plurality of dies to interact with said lens forming assembly and space the respective convex optical forming surface of each of said second plurality of dies a second fixed distance from said reference curve, whereby the spacing at closest approach of any arbitrarily selected pair of dies is a constant, and thereafter forming a lens between said dies.

2. The method for producing ophthalmic lenses of claim 1, further including the step of providing a sleeve in said lens forming assembly for joining together said pair of arbitrarily selected dies in a lens casting assembly, said sleeve maintaining said first and second fixed distances of said pair of dies from said reference curve.

3. The method for producing ophthalmic lenses of claim 1, wherein said spacing at closest approach of said arbitrarily selected pair of dies is a constant equal to the sum of said first and second fixed distances.

4. The method for producing ophthalmic lenses of claim 1, further including the step of providing a bore in said lens forming assembly for joining together said pair of arbitrarily selected dies in a compression molding assembly.

* * * * *